US012518326B2

(12) United States Patent
Albero et al.

(10) Patent No.: US 12,518,326 B2
(45) Date of Patent: Jan. 6, 2026

(54) ENERGY OPTIMIZATION PLATFORM USING ARTIFICIAL INTELLIGENCE FOR CONTAINER ROUTING

(71) Applicant: Bank of America Corporation, Charlotte, NC (US)

(72) Inventors: George Albero, Charlotte, NC (US); Maharaj Mukherjee, Poughkeepsie, NY (US); Jinna Kim, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 567 days.

(21) Appl. No.: 17/959,417

(22) Filed: Oct. 4, 2022

(65) Prior Publication Data

US 2024/0112285 A1   Apr. 4, 2024

(51) Int. Cl.
*G06Q 50/06* (2024.01)
*G06Q 10/04* (2023.01)

(52) U.S. Cl.
CPC ............. *G06Q 50/06* (2013.01); *G06Q 10/04* (2013.01)

(58) Field of Classification Search
CPC ................. G06Q 10/04; G06Q 50/06
See application file for complete search history.

(56) References Cited

U.S. PATENT DOCUMENTS

| | | | |
|---|---|---|---|
| 8,214,843 B2 * | 7/2012 | Boss ..................... | G06F 9/5094 718/104 |
| 8,849,469 B2 * | 9/2014 | Belady .................. | G06F 1/3203 700/297 |
| 9,104,435 B2 | 8/2015 | Potkonjak | |
| 9,326,236 B2 | 4/2016 | Ligman et al. | |
| 9,326,237 B2 | 4/2016 | Ligman et al. | |
| 9,552,234 B2 | 1/2017 | Boldyrev et al. | |
| 9,648,636 B2 | 5/2017 | Elfstrom et al. | |
| 9,800,517 B1 * | 10/2017 | Anderson ............... | H04L 47/70 |
| 9,888,067 B1 * | 2/2018 | Yemini ............... | H04L 67/1008 |
| 10,110,003 B2 | 10/2018 | Stalker | |
| 10,121,021 B1 * | 11/2018 | Fonseka ............. | G06F 21/6218 |
| 10,250,522 B1 * | 4/2019 | Anderson ............... | H04L 47/70 |
| 10,290,289 B2 | 5/2019 | Jahagirdar et al. | |
| 10,331,191 B2 | 6/2019 | Potkonjak | |
| 10,490,170 B2 | 11/2019 | Jahagirdar et al. | |
| 10,660,241 B2 | 5/2020 | Brunstetter | |

(Continued)

*Primary Examiner* — Vincent H Tran
(74) *Attorney, Agent, or Firm* — Banner & Witcoff, Ltd.

(57) ABSTRACT

Aspects of the disclosure relate to energy optimization. A computing platform may receive an event processing request, and may identify its parameters. The computing platform may package, based on the parameters, the event processing request into containers. The computing platform may input the parameters into an energy optimization model, which may identify: a data center computing system and an energy mix for processing the event processing request. The computing platform may encrypt the containers. The computing platform may send, to the data center computing system, the encrypted containers and commands directing the data center computing system to: decrypt the encrypted containers to identify the event processing request, and process the event processing request using the energy mix, which may cause the data center computing system to decrypt the encrypted containers and process the event processing request using the energy mix.

20 Claims, 8 Drawing Sheets

(56) References Cited

U.S. PATENT DOCUMENTS

| | | | |
|---|---|---|---|
| 10,705,580 B2 | 7/2020 | Gross et al. | |
| 10,732,584 B2 | 8/2020 | ElBsat et al. | |
| 11,022,947 B2 | 6/2021 | ElBsat et al. | |
| 11,068,821 B2 | 7/2021 | Wenzel et al. | |
| 11,081,091 B2 | 8/2021 | Jahagirdar et al. | |
| 11,159,022 B2 | 10/2021 | Lee et al. | |
| 11,163,271 B2 | 11/2021 | Lee et al. | |
| 11,182,714 B2 | 11/2021 | Wenzel et al. | |
| 11,226,125 B2 | 1/2022 | Hogan et al. | |
| 11,343,247 B1* | 5/2022 | Ozarkar | H04L 67/56 |
| 11,424,643 B2 | 8/2022 | Islam et al. | |
| 11,677,681 B1* | 6/2023 | Alt | H04L 41/5019 |
| | | | 709/226 |
| 11,853,936 B2* | 12/2023 | McGuire | G06F 11/3428 |
| 2006/0271544 A1* | 11/2006 | Devarakonda | G06F 9/5027 |
| | | | 707/999.009 |
| 2011/0035072 A1* | 2/2011 | Jackson | G06F 9/5088 |
| | | | 700/291 |
| 2011/0282982 A1* | 11/2011 | Jain | G06F 9/5094 |
| | | | 709/223 |
| 2012/0130554 A1* | 5/2012 | Jain | G06F 9/5094 |
| | | | 700/291 |
| 2012/0240113 A1* | 9/2012 | Hur | G06F 9/45558 |
| | | | 718/1 |
| 2015/0180736 A1* | 6/2015 | Leung | H04L 41/5054 |
| | | | 709/226 |
| 2016/0087909 A1* | 3/2016 | Chatterjee | G06F 9/5094 |
| | | | 709/226 |
| 2018/0165772 A1* | 6/2018 | Crawford | G06Q 50/06 |
| 2019/0258307 A1* | 8/2019 | Shaikh | G06F 1/3206 |
| 2020/0296093 A1* | 9/2020 | Hoyos | H04L 9/3247 |
| 2021/0247994 A1* | 8/2021 | Patil | G06F 9/455 |
| 2021/0273858 A1* | 9/2021 | Radovanovic | G06N 20/00 |
| 2022/0012105 A1* | 1/2022 | Chagam Reddy | H04L 41/0893 |
| 2022/0398515 A1* | 12/2022 | McGuire | G06F 11/3428 |
| 2023/0138727 A1* | 5/2023 | Wong | G06Q 10/06375 |
| | | | 705/7.37 |
| 2023/0342275 A1* | 10/2023 | Kommula | G06F 11/3058 |
| 2023/0393904 A1* | 12/2023 | Jonnalagadda | G06F 9/5094 |
| 2024/0104460 A1* | 3/2024 | Mukherjee | G06Q 10/04 |
| 2024/0129380 A1* | 4/2024 | Ganju | G06F 11/3062 |

\* cited by examiner

ENERGY OPTIMIZATION PLATFORM USING ARTIFICIAL INTELLIGENCE FOR CONTAINER ROUTING

BACKGROUND

Aspects of the disclosure relate to energy optimization. Event processing may be delayed due to intermittency, outages, and/or other local energy issues. Accordingly, it may be important to route requests to various different processing systems to reduce delay. It may be difficult, however, to identify optimal alternatives, in light of the constant fluctuation of energy availability and request parameters. Accordingly, it may be advantageous to train, generate, and/or otherwise host a model to identify such optimal solutions, while balancing the limitations of computing resources such as available memory, processing power, and/or other resources, and the limitations of event processing, such as time/computational delays and energy cost.

Similarly, such event processing requests may include sensitive, personal, and/or otherwise confidential information. Accordingly, if intercepted by a bad actor, there may be data leakage. Thus, it may be important to improve the security of such event processing requests.

SUMMARY

Aspects of the disclosure provide effective, efficient, scalable, and convenient technical solutions that address and overcome the technical problems associated with optimized energy source selection. In accordance with one or more embodiments of the disclosure, a computing platform comprising at least one processor, a communication interface, and memory storing computer-readable instructions may receive a first event processing request. The computing platform may identify first parameters of the first event processing request. The computing platform may package, based on the first parameters, the first event processing request into one or more containers. The computing platform may input the first parameters into an energy optimization model, which may cause the energy optimization model to identify: a first data center computing system at which to process the first event processing request, and a first energy mix for use in processing the first event processing request at the first data center computing system. The computing platform may encrypt the one or more containers. The computing platform may send, to the first data center computing system, the one or more encrypted containers and one or more commands directing the first data center computing system to: decrypt the one or more encrypted containers to identify the first event processing request, and process the first event processing request using the first energy mix, which may cause the first data center computing system to decrypt the one or more encrypted containers and process the first event processing request using the first energy mix.

In one or more instances, the computing platform may train the energy optimization model, by inputting parameters for historical event processing requests, historical energy pricing information, and historical processing capacity for a plurality of data center computing systems including the first data center computing system. In one or more instances, the parameters may be one or more of: time sensitivity, value, and necessary processing power.

In one or more examples, the first data center computing system may be one of a plurality of data center computing systems, and each data center computing system may be located in a different geographic region. In one or more examples, identifying the first data center computing system at which to process the first event processing request may include identifying a data center computing system currently configured to process the first event processing request for a lowest cost, when compared to other data center computing systems, within a predetermined timeframe.

In one or more instances, the first energy mix may be one or more energy sources, and the one or more energy sources may be different types of energy sources. In one or more instances, processing, using the first energy mix, the first event processing request may include directing one or more energy sources, corresponding to the first energy mix, to provide energy to the first data center computing system, which may cause the one or more energy sources to provide the energy to the first data center computing system.

In one or more examples, the computing platform may update, by inputting the first parameters, the first data center computing system, and the first energy mix, the energy optimization model. In one or more examples, the computing platform may update, by inputting the first parameters, the first data center computing system, and the first energy mix, the energy optimization model.

In one or more instances, the computing platform may identify that an accuracy level of the energy optimization model has reached a threshold accuracy level. Based on identifying that the accuracy level has reached the threshold accuracy level, the computing platform may halt updates to the energy optimization model until the accuracy level falls below the threshold accuracy level. In one or more instances, the computing platform may receive, from a user device, an energy mix preference input, specifying one or more energy sources to be included in the first energy mix, which may cause a backend table of preferred energy sources for the corresponding user to be updated so as to include the particular energy source.

In one or more examples, packaging the first event processing request into the one or more containers may include packaging, based on a capacity of the one of more containers and a size of the first event processing request, the first event processing request. In one or more examples, encrypting the one or more containers may include: 1) hashing the one or more containers; and 2) sending, to the first data center computing system, the hashes of the one or more containers, where the first data center computing system may be configured to decrypt the one or more encrypted containers by authenticating itself through comparison of the received hashes to the hashes of the one or more containers at the computing platform. In one or more examples, the one or more containers may include a container cluster, the container cluster may have a first security profile, and each container of the one or more containers may have a unique security profile, different than the first security profile.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe using artificial intelligence (AI) and containers for energy optimization. In some instances, enterprise organizations may want to eliminate or reduce their carbon footprint (e.g., in instances where they wish to become carbon neutral). The systems and methods described herein may also align with digital banking policies. Data centers may be large consumers of energy, and thus organizations may wish to minimize energy consumption on processing.

In a cloud platform, containers may be self-contained pieces of code with a virtual platform and associated memory. While deciding which data center to run a container, data centers that use more renewable energy sources, green energy sources, and the like (e.g., as opposed to fossil fuels) may be selected. Low priority containers may be combined and run in off hours (e.g., nighttime), and containers that must run during peak/business hours may be prioritized.

Containers may be routed within the cloud to optimize the maximum use of green energy, renewable energy, and the like. Routing may be prioritized to use the most energy efficient servers first. For example, an enterprise may have mapped where and how much energy is being used at any given time.

Since solar and wind energies may be intermittent depending on time and location, jobs may be scheduled when most of the energies are supplied by renewable sources, green sources, and the like. To solve for intermittency and potential outages, weather forecasting and geolocation data may be pulled in. Jobs may be continuously re-routed to various time zones so that to capture advantageous weather conditions (e.g., to choose locations to capture solar energy 24/7 by following the path of the sun, by choosing locations having substantial sun (e.g., sunnier in California or Australia), by choosing locations with substantial wind (e.g., is it windier in Europe or the United States) and the like). Time sensitive jobs may be taken into account, and a lower energy mix or lower rate of renewables may be used accordingly.

Figure 1A:
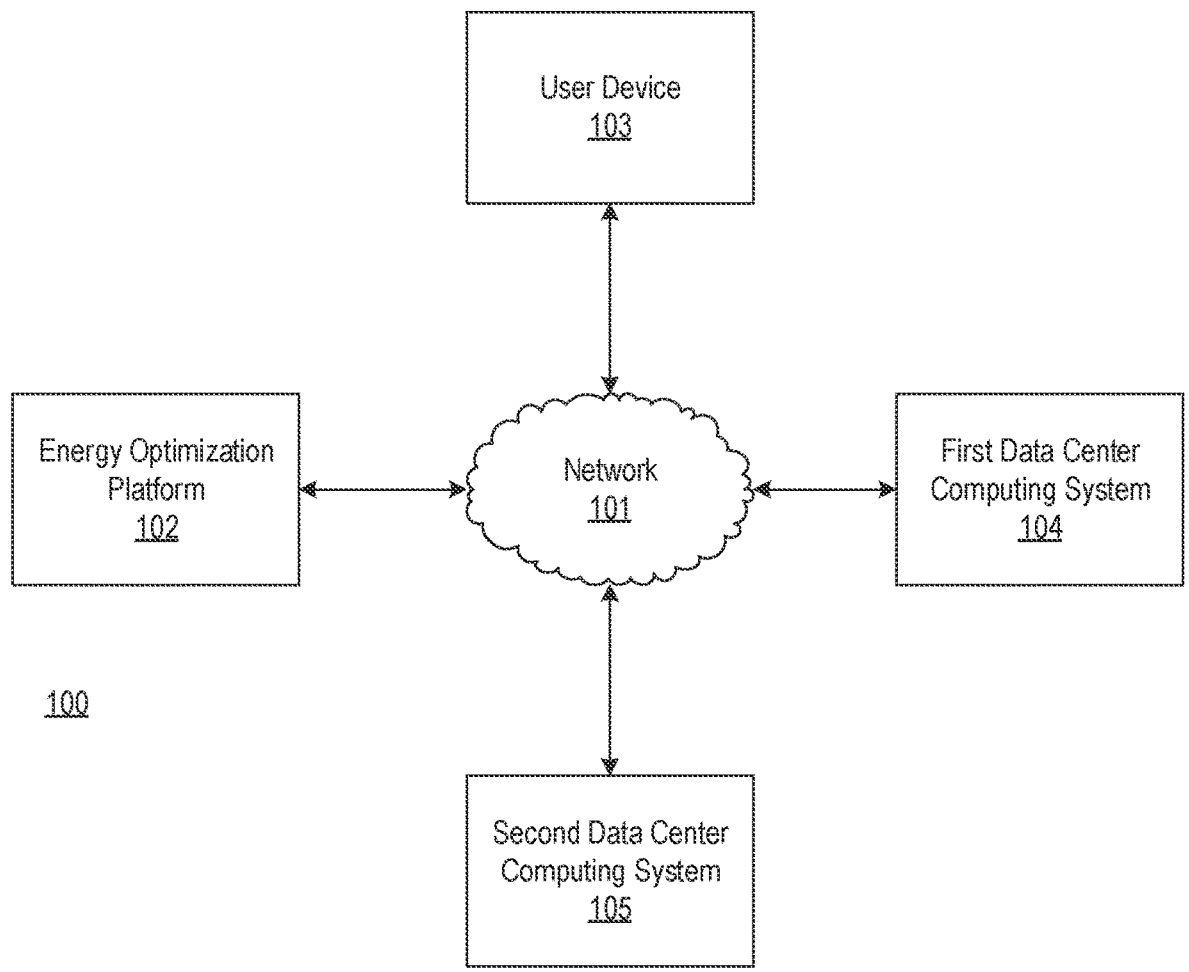
FIGS. 1A-1B depict an illustrative computing environment for energy optimization using artificial intelligence (AI) and secure containers in accordance with one or more example embodiments.
Figure 1B:
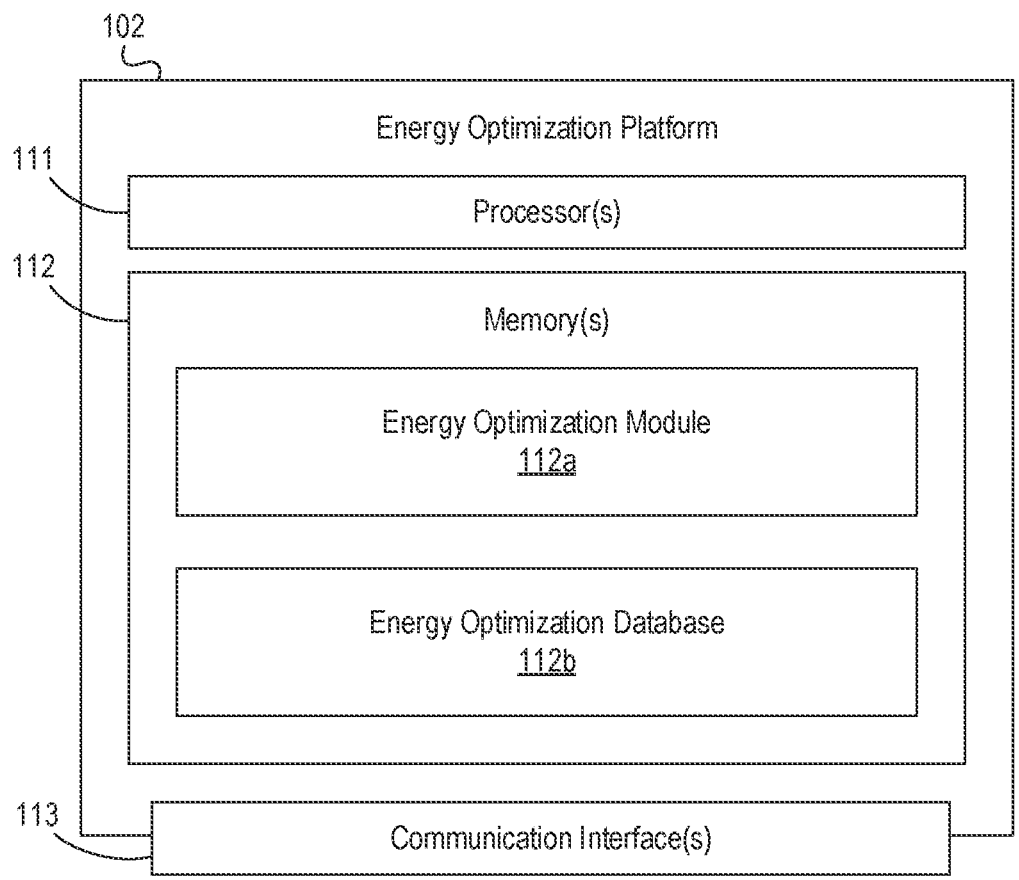

FIGS. 1A-1B depict an illustrative computing environment for energy optimization using AI and secure containers in accordance with one or more example embodiments. Referring to FIG. 1A, computing environment 100 may include one or more computer systems. For example, computing environment 100 may include an energy optimization platform 102, a user device 103, a first data center computing system 104, and a second data center computing system 105.

As described further below, energy optimization platform 102 may be a computer system that includes one or more computing devices (e.g., servers, server blades, or the like) and/or other computer components (e.g., processors, memories, communication interfaces) that may be used to train, host, and/or otherwise refine an energy optimization model, which may, e.g., be trained to identify optimal data centers at which to process event processing requests (e.g., stock trades, fund transfers, balance inquiries, mortgage applications, loan applications, and/or other requests). In these instances, optimization of the data centers may refer to one or more data centers configured to process the event processing requests within a predetermined time period (e.g., a maximum specified processing time) for the lowest energy cost, using a specified mix of energy sources, and/or otherwise. Additionally or alternatively, the optimization may refer to identifying an energy mix for each data center that enables processing of the event processing requests within a predetermined time period (e.g., a maximum specified processing time) for the lowest energy cost. In these instances, the energy optimization model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing, hybrid quantum computing, and/or other models.

In some instances, the energy optimization platform 102 may further be configured to package event processing requests into secure containers/container clusters, which may be provided to the data centers for processing. In some of these instances, the energy optimization platform 102 may be further configured to encrypt the containers for secure transmission.

User device 103 may be a mobile device, tablet, smartphone, desktop computer, laptop computer, and/or other device that may be used by an individual (e.g., a client of a financial institution, investor, enterprise employee and/or other individual) to input an event processing request (e.g., stock trades, fund transfers, balance inquiries, mortgage applications, loan applications, and/or other requests). In some instances, the user device 103 may be configured to provide one or more user interfaces (e.g., energy optimization interfaces, event processing interfaces, or the like).

First data center computing system 104 may include one or more computing devices (e.g., servers, server blades, and/or other devices) and/or other computer components (e.g., processors, memories, communication interfaces). In some instances, first data center computing system 104 may be configured to support processing of event processing requests in a particular geographic region. As described herein, event processing requests from various other geographic regions may similarly be routed to the first data center computing system 104 for processing.

Second data center computing system 105 may include one or more computing devices (e.g., servers, server blades, and/or other devices) and/or other computer components (e.g., processors, memories, communication interfaces). In some instances, second data center computing system 105 may be configured to support processing of event processing requests in a particular geographic region (e.g., different than the geographic region of the first data center computing system 104). As described herein, event processing requests from various other geographic regions may similarly be routed to the second data center computing system 105 for processing. Although computing environment 100 includes two data center computing systems as depicted, this is for illustrative purposes only, and any number of data center computing systems may be depicted without departing from the scope of the disclosure. Similarly, in some instances, these data center computing systems may include crowd-sourced energy sources (e.g., individual who may have extra computing power/resources that may be used to perform one or more data center computing functions, such as event processing).

Computing environment 100 also may include one or more networks, which may interconnect energy optimization platform 102, user device 103, first data center computing system 104, second data center computing system 105, or the like. For example, computing environment 100 may include a network 101 (which may interconnect, e.g., energy optimization platform 102, user device 103, first data center computing system 104, second data center computing system 105, or the like).

In one or more arrangements, energy optimization platform 102, user device 103, first data center computing system 104, and second data center computing system 105 may be any type of computing device capable of sending and/or receiving requests and processing the requests accordingly. For example, energy optimization platform 102, user device 103, first data center computing system 104, second data center computing system 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of energy optimization platform 102, user device 103, first data center computing system 104, and/or second data center computing system 105 may, in some instances, be special-purpose computing devices configured to perform specific functions.

Referring to FIG. 1B, energy optimization platform 102 may include one or more processors 111, memory 112, and communication interface 113. A data bus may interconnect processor 111, memory 112, and communication interface 113. Communication interface 113 may be a network interface configured to support communication between energy optimization platform 102 and one or more networks (e.g., network 101, or the like). Memory 112 may include one or more program modules having instructions that when executed by processor 111 cause energy optimization platform 102 to perform one or more functions described herein and/or one or more databases that may store and/or otherwise maintain information which may be used by such program modules and/or processor 111. In some instances, the one or more program modules and/or databases may be stored by and/or maintained in different memory units of energy optimization platform 102 and/or by different computing devices that may form and/or otherwise make up energy optimization platform 102. For example, memory 112 may have, host, store, and/or include energy optimization module 112a and an energy optimization database 112b.

Energy optimization module 112a may have instructions that direct and/or cause energy optimization platform 102 to execute advanced techniques to identify optimal resources for energy optimization in event processing. In some instances, the energy optimization module 112a may include an energy optimization model. Energy optimization database 112b may store information used by energy optimization module 112a and/or energy optimization platform 102 to identify optimal resources for energy optimization, and/or in performing other functions.

Figure 2A:
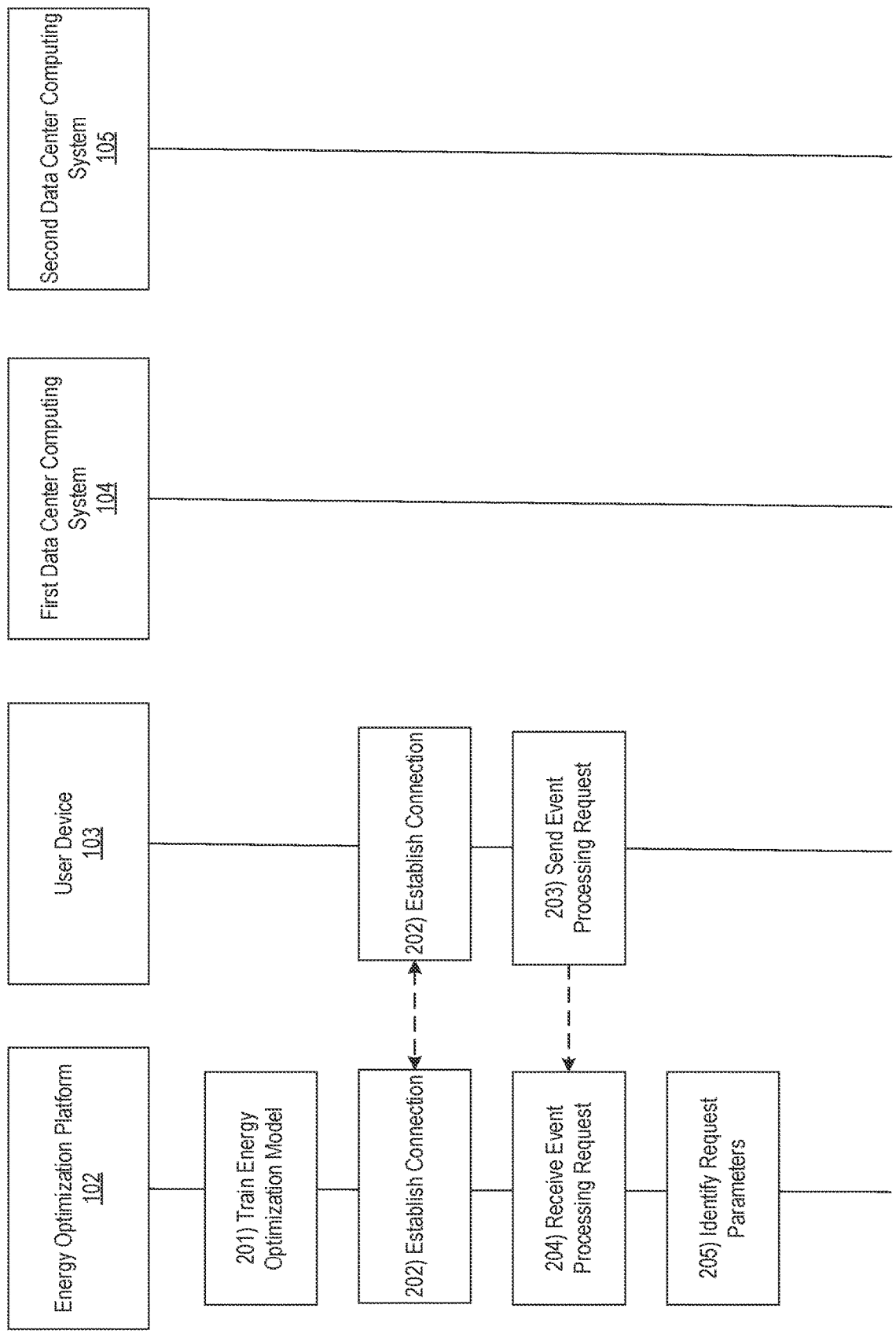
FIGS. 2A-2D depict an illustrative event sequence for energy optimization using AI and secure containers in accordance with one or more example embodiments.

FIGS. 2A-2D depict an illustrative event sequence for energy optimization using AI and secure containers in accordance with one or more example embodiments. Referring to FIG. 2A, at step 201, the energy optimization platform 102 may train an energy optimization model. For example, the energy optimization platform 102 may train a model configured to input parameters of an event processing request, and identify a data center at which to process the event processing request and an energy mix for use at the corresponding data center in processing the event processing request. To do so, the energy optimization model may input a number of historical event processing requests, the corresponding parameters (e.g., necessary processing power, time limitations, value, event type, and/or other information), historical energy pricing information, historical outage information, intermittency information, historical processing capacity for various data center computing systems, weather information, geographic information, climate information, and/or other information.

For example, the energy optimization model may be trained to identify a data center computing system that may be most optimal. In these instances, optimal may refer to having an ability (e.g., processing power, capacity, memory, and/or other characteristics) to process the event processing request within a predetermined period of time (which may, e.g., be included in the parameters) for the lowest cost, and these various data center computing systems may be located in various different geographic regions. For example, the parameters and historical data center processing information (e.g., indicating which data center computing systems processed events with certain parameters and the corresponding energy cost information, such as historical prices of both green and non-green energy sources that support the corresponding data center computing systems) may be fed into the energy optimization model. In some instances, green energy sources (which may, as described herein, include other clean/renewable energy sources) may include energy received from sources considered renewable and/or clean (e.g., wind, solar, hydro, and/or other energy sources), whereas non-green energy sources may include sources from fossil fuel (e.g., oil, coal, natural gas, and/or other energy sources). Similarly, a dynamic link between various data center computing systems (e.g., first data center computing system 104, second data center computing system 105, and/or other data center computing systems) may be established so as to enable the energy optimization platform 102 to dynamically monitor processing conditions (e.g., processing power, capacity, memory, processing load, and/or other information) for the various data center computing systems. In doing so, the energy optimization model may be trained to identify first, which data center computing systems are able to process a given event processing request at a given time, and second, of these identified data center computing systems, which may be the least expensive.

In some instances, the energy optimization platform 102 may train the energy optimization model to identify which data center computing system may be the least expensive by identifying an optimal (e.g., lowest cost, most tailored to user preferences, and/or otherwise) mix of energy sources for use in providing the energy needed to process a given event processing request. For example, historical event processing requests, the corresponding parameters (e.g., as described above), energy cost trends (e.g., from various energy sources configured to support the given data center computing systems), user preference information (e.g., a preference for particular green energy sources, or the like), outage information, intermittency information, weather information, energy source information, climate information, and/or other information may be fed into the energy optimization model to configure the energy optimization model to identify an optimal (e.g., most cost effective or most tailored to specific user preferences) mix of energy sources for use in processing the request. In some instances, this optimal mix of energy sources may include both green and non-green sources of energy.

In some instances, the energy optimization model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing, hybrid quantum computing, and/or other models.

At step 202, user device 103 may establish a connection with the energy optimization platform 102. For example, the user device 103 may establish a first wireless data connection with the energy optimization platform 102 to link the energy optimization platform 102 with the user device 103 (e.g., to link the user device 103 with the energy optimization platform 102). In some instances, the user device 103 may identify whether a connection is already established with the energy optimization platform 102. If a connection is already established with the energy optimization platform 102, the user device 103 might not reestablish the connection. Otherwise, if a connection is not yet established with the energy optimization platform 102, the user device 103 may establish the first wireless data connection as described herein.

At step 203, the user device 103 may send an event processing request to the energy optimization platform 102. For example, the user device 103 may send a request to execute stock trades, fund transfers, balance inquiries, mortgage applications, loan applications, perform a cryptocurrency transaction, and/or execute other functions. In some instances, the user device 103 may send the event processing request based on receiving input from a user via an interface of the user device 103.

In some instances, the user device 103 may send, along with the event processing request, parameters of the event processing request. For example, the user device 103 may send any value information (e.g., number of shares, monetary value, fiat amount, cryptocurrency amount, and/or other value information), time constraints (e.g., processing deadline, or other time information), processing preference information (e.g., whether to use only green energy for processing, or other specified energy mix information), an amount of processing power needed to process the event, and/or other information.

In instances where processing preference information is sent, this may, in some instances be based on a user preference profile, which may, e.g., be configured and/or modified based on user input received via an interface of the user device (e.g., during a user registration process or otherwise). For example, a user may configure energy preferences by selecting, deselecting, and/or otherwise modifying a list of energy types (e.g., solar, wind, hydro, geothermal, fossil fuel, nuclear, and/or other types) to be used in processing events for the user. For example, a table of acceptable energy types may be stored and associated with each user's user preference profile. Corresponding users may provide input that causes these acceptable energy types to be removed or added from the table, which may, e.g., cause the table/user preference profile to be modified. In some instances, the user device may send the event processing request while the first wireless data connection is established.

At step 204, the energy optimization platform 102 may receive the event processing request sent at step 203. In some instances, the energy optimization platform 102 may cause a table of acceptable energy types/user preference profile to be updated based on any user preference information included in the event processing request. In some instances, the energy optimization platform 102 may receive the event processing request via the communication interface 113 and while the first wireless data connection is established.

At step 205, the energy optimization platform 102 may identify parameters of the event processing request. For example, the energy optimization platform 102 may identify necessary processing power, time limitations, value, event type, energy preference information, key performance indicators, and/or other information. In some instances, the energy optimization platform 102 may assign a priority value, which may then be input into the energy optimization model described below, for the event processing request (e.g., based on any time limitations).

Figure 2B:
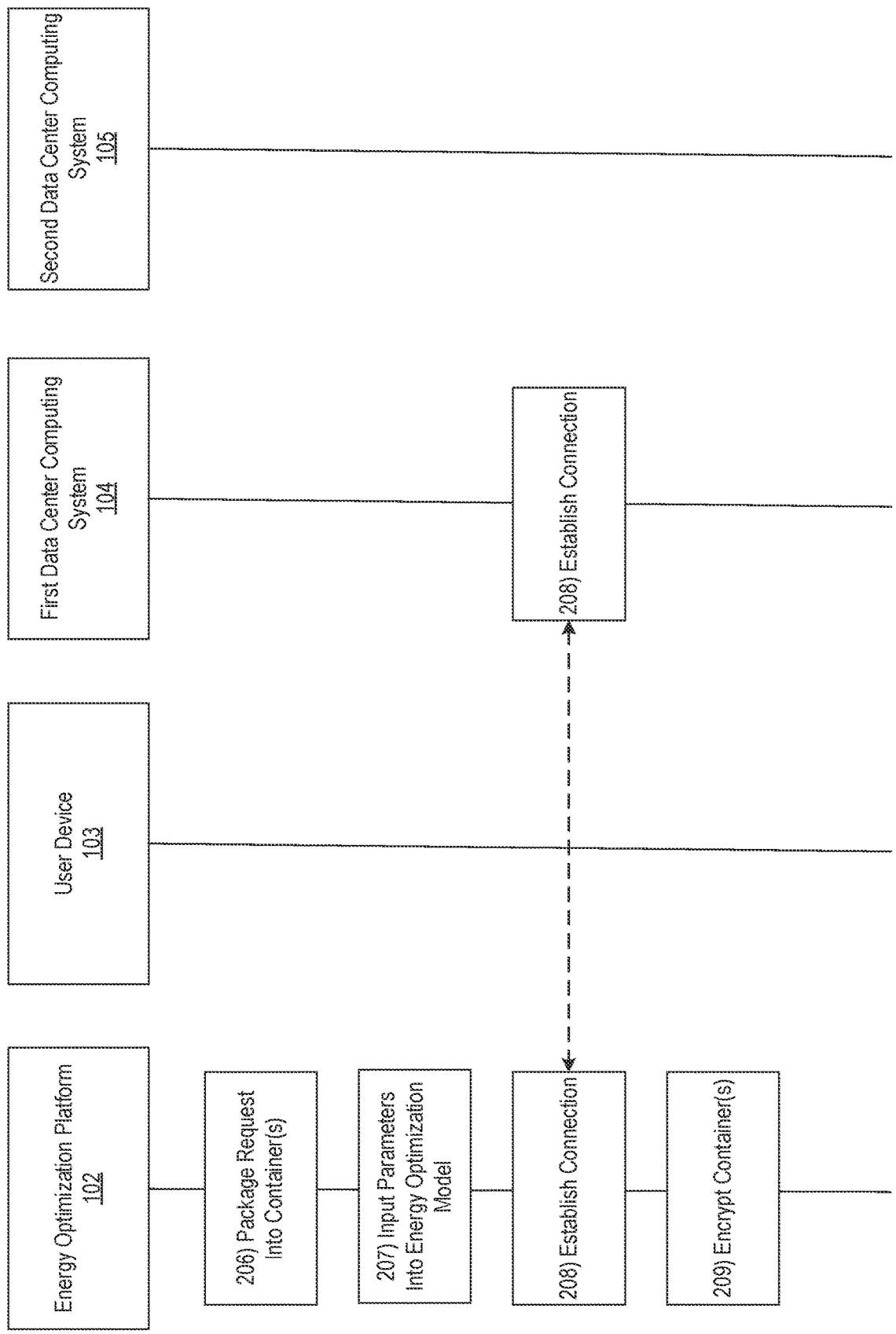

Referring to FIG. 2B, at step 206, the energy optimization platform 102 may package the event processing request into one or more containers. In some instances, the containers may have a standard size, and the event processing request may be broken into one or more containers based on a comparison of the size of the event processing request and the standard size (e.g., if the size of the event processing request is more than the standard size of a single container, but less than the standard size of two containers, the event processing request may be split, e.g., based on tasks included in the event processing request into the two containers). In instances where more than one container are used for the event processing request, these containers may be referred to as a container cluster. By packaging the event processing requests into the one or more containers, the energy optimization platform 102 may package the event processing requests within lightweight software that may be run using any type of hardware, which may provide flexibility in processing.

At step 207, the energy optimization platform 102 may input the parameters of the event processing request into the energy optimization model. For example, the energy optimization platform 102 may use the energy optimization model to identify a data center computing system at which to process the event processing request (e.g., a data center computing system that may process the event processing request within the corresponding time limitation for the lowest energy cost). The energy optimization platform 102 may identify these data center computing systems available for processing the event processing request in a timely manner by identifying data center computing systems with available computing capacity to process the event processing request within the time limitation based on the processing power needed to process the event processing request.

Once these available data center computing systems have been identified, the energy optimization platform 102 may identify an amount of energy needed to process the event processing request, and may identify a corresponding cost of producing that amount of energy for each of the identified data center computing systems configured to process the event processing request within the corresponding time frame (e.g., based on historical energy cost information).

In some instances, the energy optimization platform 102 may also take into account any weather or environmental patterns that may impact processing of the event. For example, availability of solar power may fluctuate based on time of day in a particular region, but may always be available in some region (e.g., as movement of the sun is followed). Accordingly, in these instances, the energy optimization platform 102 may consider such patterns so as to select various data center computing systems in a pattern that follows the sun. Similar techniques may be used to identify data center computing systems from East to West and North to South across the globe, which may, e.g., be configured to provide the largest amount of a particular energy source (e.g., not limited only to solar, but to other energy sources as well). In some instances, by tracing environmental patterns in this way, the energy optimization platform 102 may help to minimize the cost of energy used to process the requested event.

In some instances, in identifying the cost of producing the necessary amount of energy, the energy optimization platform 102 may use the energy optimization model to identify various mixes of energy sources configured to provide the corresponding energy for each identified data center computing system. In some instances, the energy optimization model may rank these energy sources according to energy cost. In some instances, in doing so, the energy optimization model may take into account whether a given energy source produces storable energy, or whether the energy produced may be available only temporarily for use. In these instances, such factors may be considered by the energy optimization model so as to reduce wasted energy by ensuring the timely use of any energy for which storage is not available. In some instances, the energy optimization may further rank these energy sources according to any user preferences. For example, if the user specified a preference for green energy sources, any green energy sources may be ranked, for example, higher than fossil fuel or other sources. Otherwise, if the user specified a preference for a lowest cost solution, the energy sources may be ranked based on cost. Once ranked, the energy optimization model may output the highest ranked mix of energy sources for each identified data center computing system. In some instances, the mix of energy sources may include a single energy source, or multiple energy sources.

In some instances, each data center computing system may be configured with a hierarchy of energy sources to be used if available. For example, the first data center computing system 104 may be located in a region where solar power is the least expensive energy, fossil fuel is second, and wind power is third. In these instances, the first data center computing system 104 may identify that all available solar power should be used in processing the event processing request until depleted, at which point, fossil fuel should be used, and so on. In some instances, the first data center computing system 104 and/or energy optimization platform 102 may dynamically adjust this hierarchy on a regular basis (e.g., hourly, daily, weekly, etc.) based on weather patterns, environmental factors, and/or other information. For example, the energy optimization platform 102 and/or first data center computing system 104 may adjust for solar power to be used only during daylight hours, or the like.

Once an energy mix has been identified for the identified data center computing system, the energy optimization platform 102 may rank these data center computing systems (e.g., based on cost, energy source preferences, and/or otherwise), and select the top ranked data center computing system. For illustrative purposes, it may be assumed that the energy optimization platform 102 may identify, using the energy optimization model, that the first data center computing system 104 may be more optimal for processing the event processing request than the second data center computing system 105.

In some instances, the event processing requests may be continuously fed through the energy optimization model, which may, in some instances, result in identification of a different data center computing system than originally identified (e.g., based on available processing resources, the changing energy mix, and/or otherwise). In these instances, the energy optimization platform 102 may shift the corresponding containers (or a portion thereof) to the newly identified data center computing system. In doing so, requests may be continuously routed for the most optimal (e.g., based on lowest cost, preferred energy mix, processing time, and/or otherwise) processing.

In some instances, this information may be used to provide advance notice to various data centers informing them of their particular energy mixes, processing trends, and/or other information, which may, e.g., enable the data centers to prepare for event processing. For example, the energy optimization platform 102 may identify that green energy is available for a given data center during a particular time frame, but not otherwise, and may notify this data center that containers/event processing requests may be routed to it during this identified time frame accordingly.

At step 208, the energy optimization platform 102 may establish a connection with the first data center computing system 104. For example, the energy optimization platform 102 may establish a second wireless data connection with the first data center computing system 104 to link the energy optimization platform 102 with the first data center computing system 104 (e.g., in preparation for directing event processing requests). In some instances, the energy optimization platform 102 may identify whether a connection is already established with the first data center computing system 104. If a connection is already established with the first data center computing system 104, the energy optimization platform 102 might not re-establish the connection. If a connection is not yet established with the first data center computing system 104, the energy optimization platform 102 may establish the second wireless data connection as described above.

At step 209, the energy optimization platform 102 may encrypt and/or otherwise secure the one or more containers. For example, the energy optimization platform 102 may hash the one or more containers, and may share the hash value(s) with the first data center computing system 104. Additionally or alternatively, the energy optimization platform 102 may encrypt the one or more containers using public and/or private keys, which may similarly be shared with the first data center computing system 104. Additionally or alternatively, the energy optimization platform 102 may encrypt the one or more containers using a multifactor authentication scheme. In some instances, where a cluster of containers is used, different encryption mechanisms and/or levels of encryption may be used to encrypt the various containers. For example, a first level of encryption and/or security profile may be applied to the cluster itself, and a second level of encryption and/or security profile may be applied to each of the individual containers. In some instances, a different security mechanism may be applied to each container. In some instances, these security mechanisms/profiles may be set or otherwise customized on a user by user basis. By applying such encryption, the energy optimization platform 102 may enhance security of the event processing request, as it would prevent accessing any secure or otherwise sensitive data, included in the event processing request, in the event that the container is intercepted.

Figure 2C:
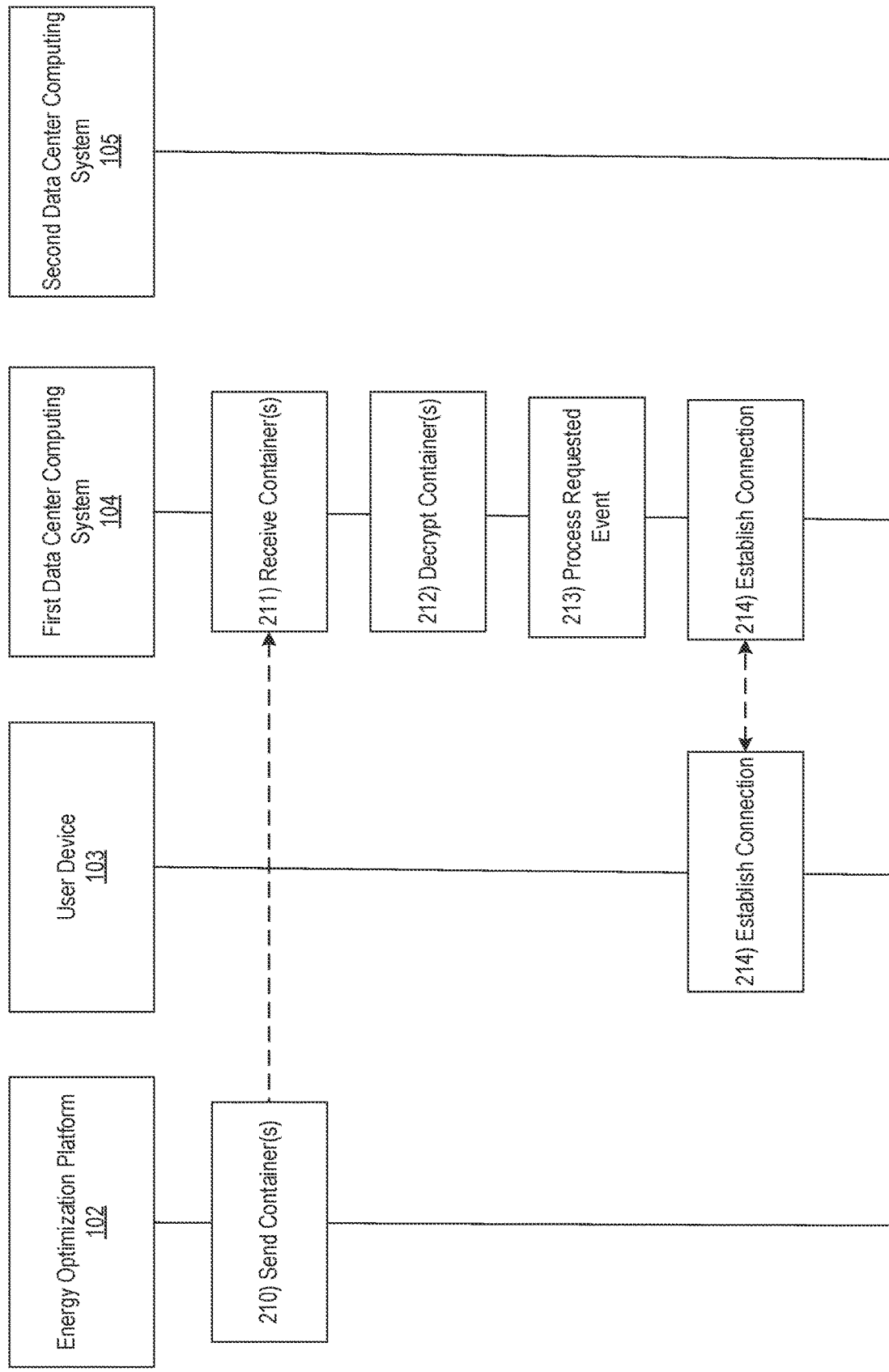

Referring to FIG. 2C, at step 210, the energy optimization platform 102 may direct the one or more containers (e.g., containing the event processing request) to the first data center computing system 104. For example, the energy optimization platform 102 may direct the one or more containers to the first data center computing system 104 via the communication interface 113 and while the second wireless data connection is established.

Although the one or more containers are depicted as being sent to a data center computing system for processing, it may, in some instances, be split, and multiple containers and/or portions, tasks, or jobs of the one or more containers may be distributed to different data center computing systems for processing. Additionally or alternatively, multiple different containers (e.g., for different event processing requests, tasks, jobs, or the like) may be combined. In instances where these containers have a low priority value (e.g., a processing time that is above a priority time threshold, or the like), these containers may be held for processing in off-hours (e.g., night time), whereas containers with a high priority value (e.g., a processing time that is below the priority time threshold, or the like) may be prioritized for processing during peak/business hours. In some instances, the energy optimization platform 102 may also send one or more commands directing the first data center computing system 104 to decrypt the one or more encrypted containers to identify the first event processing request and process the first event processing request using the identified energy mix.

At step 211, the first data center computing system 104 may receive the one or more containers sent at step 210. For example, the first data center computing system 104 may receive the one or more containers while the second wireless data connection is established. In some instances, the first data center computing system 104 may also receive one or more commands directing the first data center computing system 104 to decrypt the one or more encrypted containers to identify the first event processing request and process the first event processing request using the identified energy mix.

At step 212, based on or in response to the one or more commands directing the first data center computing system 104 to decrypt the one or more encrypted containers to identify the first event processing request and process the first event processing request using the identified energy mix, the first data center computing system 104 may decrypt the one or more containers. For example, the first data center computing system 104 may decrypt the one or more containers using the public key(s), private key(s), hash value(s), and/or other decryption information received from the energy optimization platform 102. In these instances, in decrypting the one or more containers, the first data center computing system 104 may identify the event processing request.

At step 213, based similarly on or in response to the one or more commands directing the first data center computing system 104 to decrypt the one or more encrypted containers to identify the first event processing request and process the first event processing request using the identified energy mix, the first data center computing system 104 may process the request using the identified mix of energy sources. For example, the first data center computing system 104 may execute the fund transfer, stock trade, mortgage approval process, loan approval process, cryptocurrency transaction, and/or other event using the identified mix of energy sources. In some instances, the first data center computing system 104 and/or energy optimization platform 102 may communicate with energy distribution systems corresponding to the mix of energy sources, so as to direct those energy sources to provide the necessary energy (which may, e.g., cause these energy sources to provide the energy). Additionally or alternatively, the first data center computing system 104 may receive energy from a variety of energy sources, not specifically limited to the mix of energy sources, but then may use exclusively energy from the mix of energy sources to process the event processing request.

In some instances, the first data center computing system 104 may be partitioned so as to process multiple containers simultaneously. For example, the partitioning may enable the first data center computing system 104 to process any number of containers simultaneously. In some instances, the first data center computing system 104 may stop the processing of the event processing request (or a subset of the reject) so as to analyze any processing errors, security concerns, and/or otherwise.

At step 214, the first data center computing system 104 may establish a connection with the user device 103. For example, the first data center computing system 104 may establish a third wireless data connection with the user device 103 to link the first data center computing system 104 to the user device 103 (e.g., in preparation for sending event processing information). In some instances, first data center computing system 104 may identify whether a connection is already established with the user device 103. If a connection is already established with the energy optimization platform 102, the first data center computing system 104 might not re-establish the connection. If a connection is not yet established with the energy optimization platform 102, the first data center computing system 104 may establish the third wireless data connection as described herein.

Figure 2D:
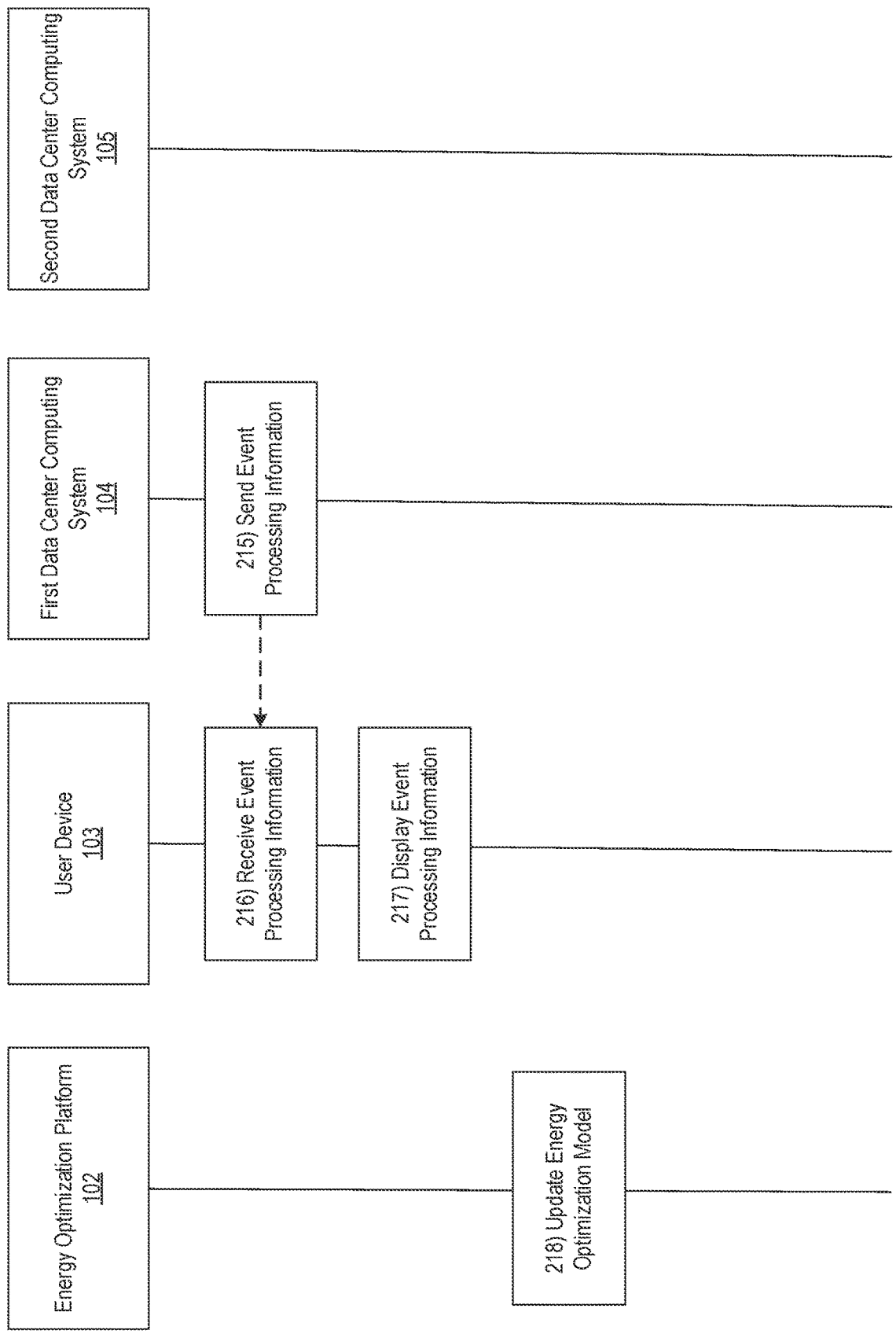

Referring to FIG. 2D, at step 215, the first data center computing system 104 may send event processing information (e.g., indicating that the requested event was processed, where the event was sent for processing, and the mix of energy used to do so) to the user device 103. For example, the first data center computing system 104 may send the event processing information to the user device 103 while the third wireless data connection is established. In some instances, the first data center computing system 104 may also send one or more commands directing the user device 103 to display the event processing information.

At step 216, the user device 103 may receive the event processing information sent at step 216. For example, the user device 103 may receive the event processing information while the third wireless data connection is established. In some instances, the user device 103 may also receive the one or more commands directing the user device 103 to display the event processing information.

Figure 4:
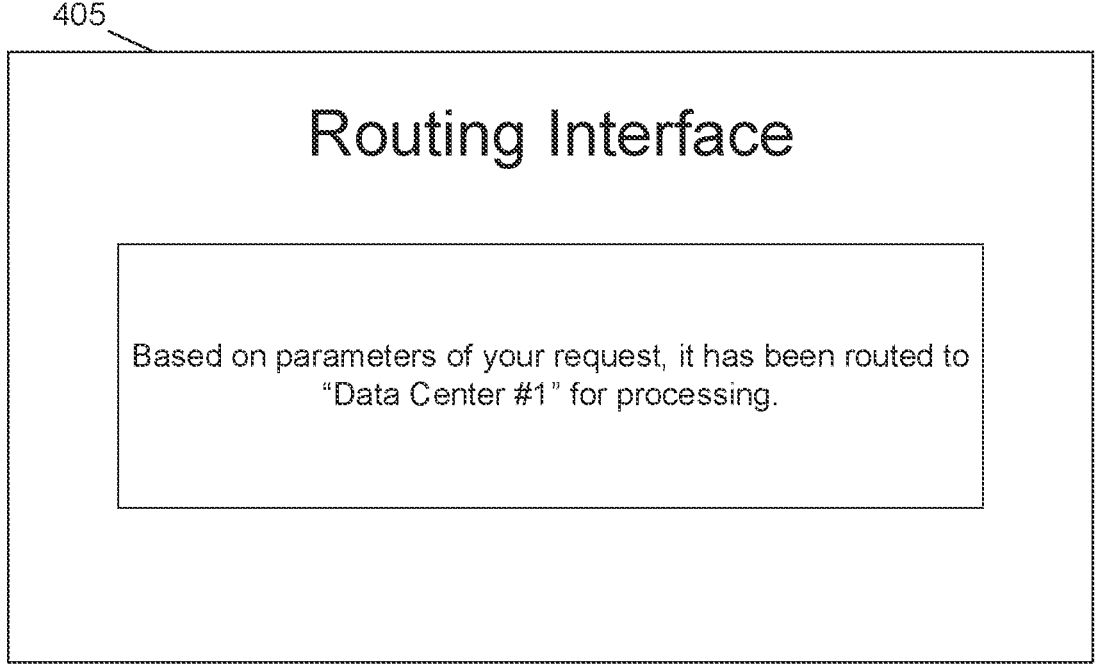
FIGS. 4 and 5 depict illustrative graphical user interfaces for energy optimization using AI and secure containers in accordance with one or more example embodiments.
Figure 5:
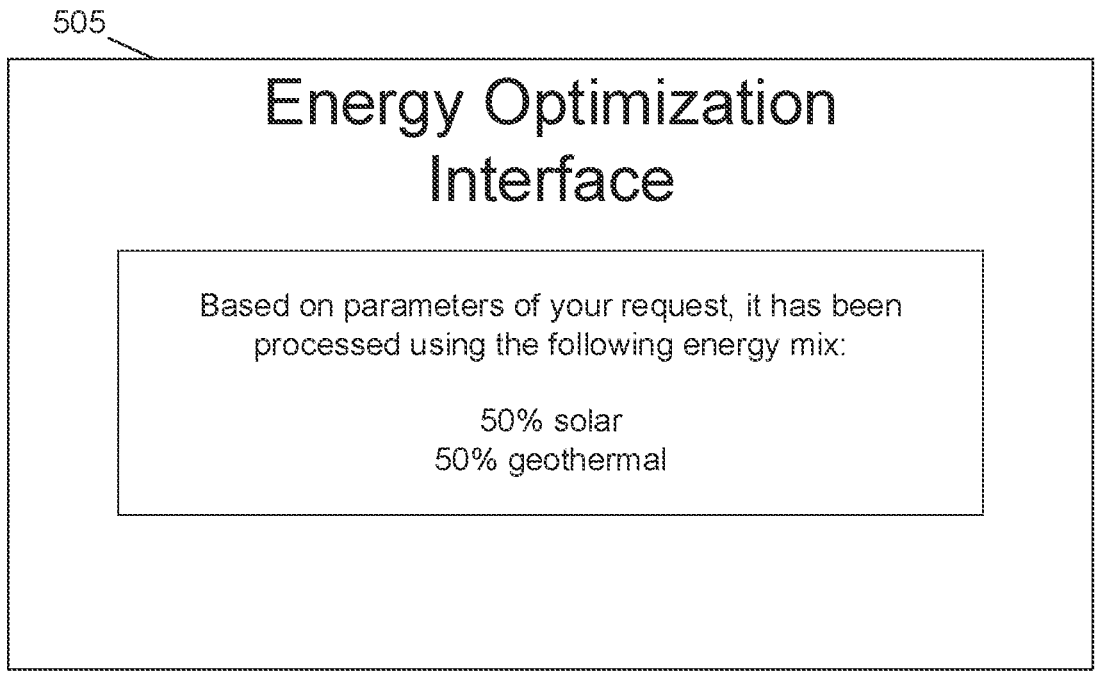

At step 217, based on or in response to the one or more commands directing the user device 103 to display the event processing information, the user device 103 may display the event processing information. For example, the user device 103 may display a graphical user interface similar to graphical user interface 405, which is shown in FIG. 4. For example, the user device 103 may display a graphical user interface indicating a region of the data center used to process the event processing request. Additionally or alternatively, the user device 103 may display a graphical user interface indicating the energy mix used to process the event processing request. For example, the user device 103 may display a graphical user interface similar to graphical user interface 505, which is shown in FIG. 5.

At step 218, the energy optimization platform 102 may update the energy optimization model based on any outputs from the models, user feedback, the parameters, the identified data center computing system (e.g., in this case, selection of the first data center computing system 104), the energy mix, and/or other information. For example, in some instances, user feedback information (e.g., indicating a level of satisfaction with processing speed, the mix of energy sources, and/or other information) may be received. In these instances, this information may be fed back into the models through a continuous and dynamic feedback loop, so as to refine the models and continually improve their accuracy. In some instances, the same feedback information may be used to update all models, or different information may be used to update the various models.

In some instances, the energy optimization platform 102 may maintain an accuracy threshold corresponding to the energy optimization model, and may halt refinement of the model where a level of accuracy meets or exceeds the accuracy threshold, so as to conserve bandwidth, processing power, and/or other computing resources. In some instances, these levels of accuracy may be based on the user feedback (e.g., if feedback is received indicating that the user is satisfied, a 1 may be assigned to the corresponding event processing request as feedback, whereas a 0 may be assigned where negative feedback is received). In these instances, a sum of the values may be identified, and then divided by the total number of values. This may provide a decimal value (e.g., the level of accuracy), which may be compared to the accuracy threshold. In some instances, only values for a predetermined time window may be considered (e.g., over the past day, week, month, etc.).

By optimizing selection of energy sources for event processing in this way, energy costs may be minimized on a per request basis without sacrificing processing time. Similarly, in some instances, green energy sources may be substituted for fossil fuel or other energy sources where possible without increasing processing delays or cost. Additionally, by securing containers and/or container clusters through encryption, the overall security of any sensitive or other personal information included in the containers/event processing requests may be further improved.

Figure 3:
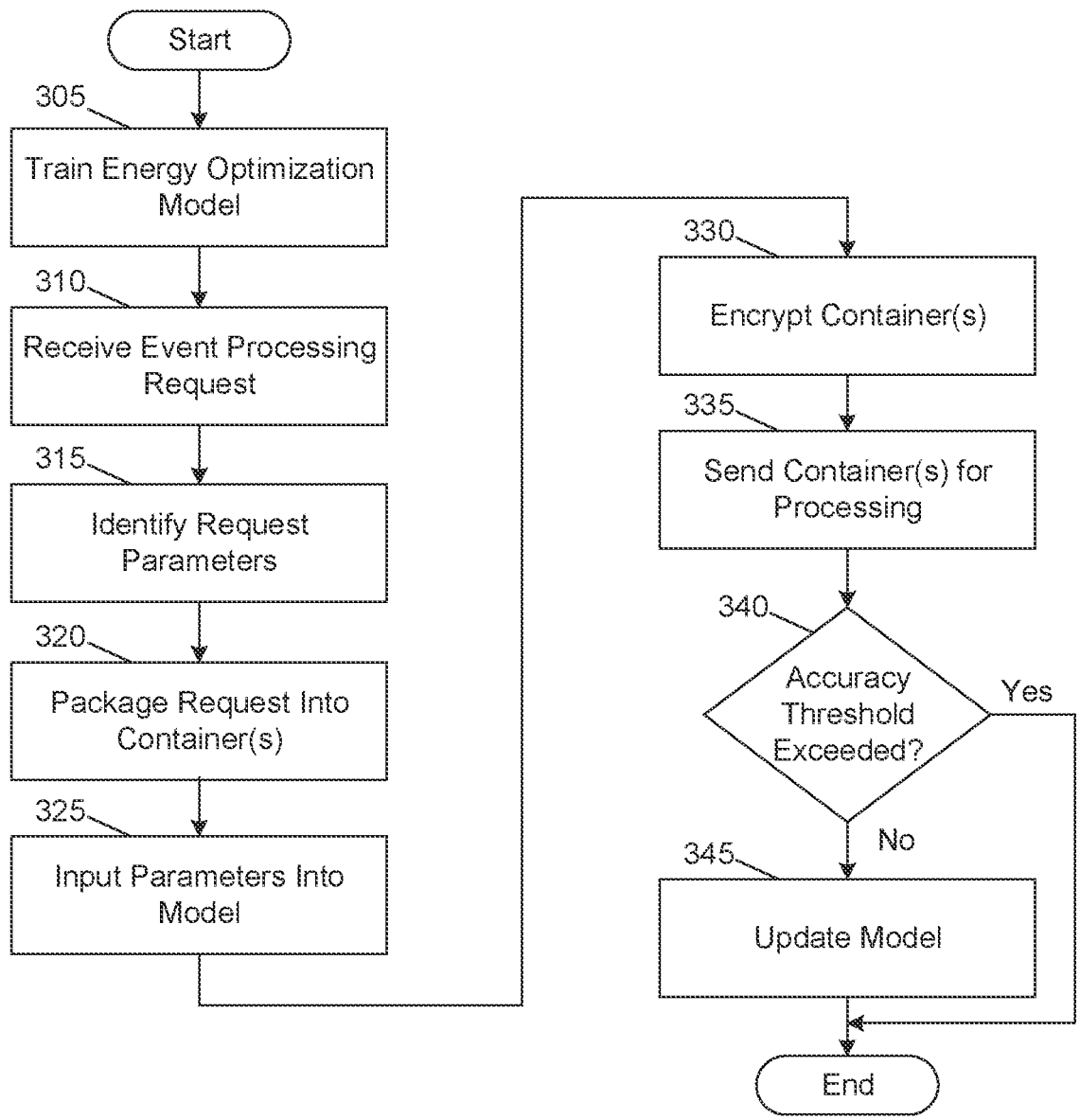
FIG. 3 depicts an illustrative method for energy optimization using AI and secure containers in accordance with one or more example embodiments.

FIG. 3 depicts an illustrative method for energy optimization using AI and secure containers in accordance with one or more example embodiments. Referring to FIG. 3, at step 305, a computing platform having at least one processor, a communication interface, and memory may train an energy optimization model. At step 310, the computing platform may receive an event processing request. At step 315, the computing platform may identify parameters of the event processing request. At step 320, the computing platform may package the event processing request into one or more containers. At step 325, the computing platform may input parameters of the event processing request into the energy optimization model to identify a data center computing system and an energy mix for use in processing the event processing request. At step 330, the computing platform may encrypt the one or more containers. At step 335, the computing platform may send the encrypted container(s) for processing at the identified data center computing system. At step 340, the computing platform may identify whether or not an accuracy threshold for the energy optimization models has been exceeded. If not, the method may end. If the accuracy threshold has not been exceeded, the computing platform may proceed to step 345 to update the energy optimization model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive a first event processing request;
   identify first parameters of the first event processing request;
   package the first event processing request into one or more containers;
   input the first parameters into an energy optimization model, wherein inputting the first parameters into the energy optimization model causes the energy optimization model to identify:
      a plurality of data center computing systems at which to process the first event processing request, including a first data center computing system in a first region and a second data center computing system in a second region, and
      a first energy mix for use in processing the first event processing request at the first data center computing system, wherein:
         solar power is available in the first region during a first period of time and available in the second region during a second period of time, later than the first period of time, and
         identification of the plurality of data center computing systems is based on a follow the sun pattern, wherein the identification includes determining that the first data center computing system should process the first event processing request during the first period of time, and that processing of the event processing request should be shifted to the second data center computing system upon expiration of the first period of time and initiation of the second period of time;
   encrypt the one or more containers; and
   send, to the first data center computing system, the one or more encrypted containers and one or more commands directing the first data center computing system to:
      decrypt the one or more encrypted containers to identify the first event processing request, and
      process the first event processing request using the first energy mix, wherein sending the one or more commands causes the first data center computing system to decrypt the one or more encrypted containers and process the first event processing request using the first energy mix.

2. The computing platform of claim 1, wherein the memory stores additional computer-readable instructions that, when executed by the one or more processors, further cause the computing platform to:
   train the energy optimization model, wherein training the energy optimization model comprises inputting parameters for historical event processing requests, historical energy pricing information, historical outage information, historical intermittency information, historical processing capacity for a plurality of data center computing systems including the first data center computing system, weather information, geographic information, and climate information.

3. The computing platform of claim 2, wherein the parameters comprise one or more of: time sensitivity, value, and necessary processing power.

4. The computing platform of claim 2, wherein the first data center computing system comprises one of a plurality of data center computing systems, and wherein each data center computing system is located in a different geographic region.

5. The computing platform of claim 1, wherein identifying the first data center computing system at which to process the first event processing request comprises identifying a data center computing system currently configured to process the first event processing request for a lowest cost, when compared to other data center computing systems, within a predetermined timeframe.

6. The computing platform of claim 1, wherein the first energy mix comprises one or more energy sources, and wherein the one or more energy sources comprise different types of energy sources.

7. The computing platform of claim 1, wherein processing, using the first energy mix, the first event processing request comprises:
   directing one or more energy sources, corresponding to the first energy mix, to provide energy to the first data center computing system, wherein directing the one or more energy sources to provide the energy to the first data center computing system causes the one or more energy sources to provide the energy to the first data center computing system.

8. The computing platform of claim 1, wherein the memory stores additional computer-readable instructions that, when executed by the one or more processors, further cause the computing platform to:
   update, by inputting the first parameters, the first data center computing system, and the first energy mix, the energy optimization model.

9. The computing platform of claim 1, wherein the memory stores additional computer-readable instructions that, when executed by the one or more processors, further cause the computing platform to:
   identify that an accuracy level of the energy optimization model has reached a threshold accuracy level; and
   based on identifying that the accuracy level has reached the threshold accuracy level, halt updates to the energy optimization model until the accuracy level falls below the threshold accuracy level.

10. The computing platform of claim 1, wherein the memory stores additional computer-readable instructions that, when executed by the one or more processors, further cause the computing platform to:
   receive, from a user device, an energy mix preference input, specifying one or more energy sources to be included in the first energy mix, wherein user selection of a particular energy source via a display of the user device causes a backend table of preferred energy sources for the corresponding user to be updated so as to include the particular energy source.

11. The computing platform of claim 1, wherein packaging the first event processing request into the one or more containers comprises packaging, based on a capacity of the one of more containers and a size of the first event processing request, the first event processing request.

12. The computing platform of claim 1, wherein encrypting the one or more containers comprises:
hashing the one or more containers; and
sending, to the first data center computing system, the hashes of the one or more containers, wherein the first data center computing system is configured to decrypt the one or more encrypted containers by authenticating itself through comparison of the received hashes to the hashes of the one or more containers at the computing platform.

13. The computing platform of claim 1, wherein:
the one or more containers comprise a container cluster,
the container cluster has a first security profile, and
each container of the one or more containers has a unique security profile, different than the first security profile.

14. The computing platform of claim 1, wherein the energy optimization model tracks, in addition to the follow the sun pattern, a follow the wind pattern, wherein processing of the first event processing request is shifted across the plurality of data center computing systems based on both the follow the sun pattern and the follow the wind pattern.

15. The computing platform of claim 1, wherein a first encrypted container of the one or more encrypted containers has a first priority value and a second encrypted container of the one or more encrypted containers has a second priority value, lower than the first priority value, wherein processing of the first encrypted container occurs by the first data center computing system during day time and processing of the second encrypted container occurs by the first data center computing system during night time.

16. A method comprising:
at a computing platform comprising at least one processor, a communication interface, and memory:
receiving a first event processing request;
identifying first parameters of the first event processing request;
packaging the first event processing request into one or more containers;
inputting the first parameters into an energy optimization model, wherein inputting the first parameters into the energy optimization model causes the energy optimization model to identify:
a plurality of data center computing systems at which to process the first event processing request, including a first data center computing system in a first region and a second data center computing system in a second region, and
a first energy mix for use in processing the first event processing request at the first data center computing system, wherein:
solar power is available in the first region during a first period of time and available in the second region during a second period of time, later than the first period of time, and
identification of the plurality of data center computing systems is based on a follow the sun pattern, wherein the identification includes determining that the first data center computing system should process the first event processing request during the first period of time, and that processing of the event processing request should be shifted to the second data center computing system upon expiration of the first period of time and initiation of the second period of time;
encrypting the one or more containers; and
sending, to the first data center computing system, the one or more encrypted containers and one or more commands directing the first data center computing system to:
decrypt the one or more encrypted containers to identify the first event processing request, and
process the first event processing request using the first energy mix, wherein sending the one or more commands causes the first data center computing system to decrypt the one or more encrypted containers and process the first event processing request using the first energy mix.

17. The method of claim 16, further comprising:
training the energy optimization model, wherein training the energy optimization model comprises inputting parameters for historical event processing requests, historical energy pricing information, historical outage information, historical intermittency information, historical processing capacity for a plurality of data center computing systems including the first data center computing system, weather information, geographic information, and climate information.

18. The method of claim 17, wherein the parameters comprise one or more of: time sensitivity, value, and necessary processing power.

19. The method of claim 16, wherein the first data center computing system comprises one of a plurality of data center computing systems, and wherein each data center computing system is located in a different geographic region.

20. One or more non-transitory computer-readable media storing instructions that, when executed by a computing platform comprising at least one processor, a communication interface, and memory, cause the computing platform to:
receive a first event processing request;
identify first parameters of the first event processing request;
package the first event processing request into one or more containers;
input the first parameters into an energy optimization model, wherein inputting the first parameters into the energy optimization model causes the energy optimization model to identify:
a plurality of data center computing systems at which to process the first event processing request, including a first data center computing system in a first region and a second data center computing system in a second region, and
a first energy mix for use in processing the first event processing request at the first data center computing system, wherein:
solar power is available in the first region during a first period of time and available in the second region during a second period of time, later than the first period of time, and
identification of the plurality of data center computing systems is based on a follow the sun pattern, wherein the identification includes determining that the first data center computing system should process the first event processing request during the first period of time, and that processing of the event processing request should be shifted to the second data center computing system upon expiration of the first period of time and initiation of the second period of time;

encrypt the one or more containers; and send, to the first data center computing system, the one or more encrypted containers and one or more commands directing the first data center computing system to:

decrypt the one or more encrypted containers to identify the first event processing request, and process the first event processing request using the first energy mix, wherein sending the one or more commands causes the first data center computing system to decrypt the one or more encrypted containers and process the first event processing request using the first energy mix.

* * * * *